Figure 1:
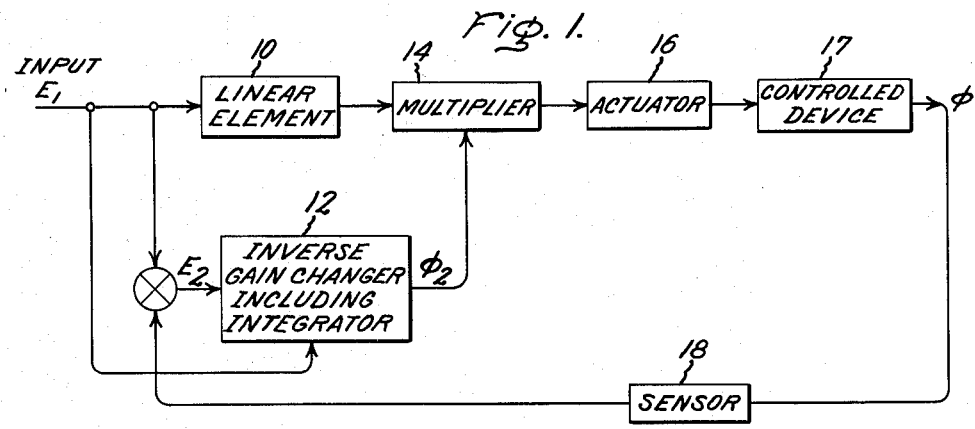

Sept. 19, 1961  U. L. SHIH  3,001,116

SERVOSYSTEM INVERSE GAIN CHANGER

Filed Oct. 28, 1957

Inventor:
Usang L. Shih,
by Francis K. Doyle
His Attorney.

3,001,116
SERVOSYSTEM INVERSE GAIN CHANGER
Usang L. Shih, Schenectady, N.Y., assignor to General Electric Company, a corporation of New York
Filed Oct. 28, 1957, Ser. No. 692,594
5 Claims. (Cl. 318—448)

This invention relates to an inverse gain changer and more particularly to an inverse gain changer to be used with a non-linear system to maintain a constant loop gain so that the response of the system to both steady state and transient conditions will not vary with the command signal.

Recently a new type of control system has been devised which includes a non-linear element in the system and provides a constant ratio between the output and input of the system for steady state conditions. This basic concept is disclosed and claimed in the copending application Serial No. 607,336, filed August 31, 1956, for "Constant Output Control System for Aircraft and the Like," in the name of Michael F. Marx and assigned to the same assignee as this invention, now Patent No. 2,941,139. In that application, there is disclosed a control system which is used to control a device, such as an aircraft, whose gain varies over a wide range. The control system disclosed contains a non-linear element which is therein described as a multiplier device. Whenever the gain of the controlled device varies, the multiplier automatically adjusts to compensate for this change in gain so that under steady state conditions the ratio between the output and input of the system is maintained constant.

However, the multiplier or non-linear element has a gain which is proportional to the input or command signal. As the command signal varies the closed loop which actuates or energizes the multiplier has a gain which varies with the command signal. This variation in gain of the closed loop results in a varying response to transient conditions of the system. Thus, though the system is stabilized for steady state conditions it may be unstable in response to transient conditions. Since such unstability in a control system is undesirable, it can be seen that there is a need for a means for maintaining a non-linear control system stable under all operating conditions.

It has been discovered that if a gain changer is added to the system, which provides an inverse change in gain to counteract the gain change of the non-linear element, that the desired overall stability will be obtained.

Therefore, it is an object of this invention to provide an inverse gain changer which will stabilize the transient response of a non-linear control system.

It is a further object of this invention to provide an inverse gain changer for a non-linear control system which will provide a gain inversely proportional to the command signal applied to the system.

A still further object of this invention is to provide an inverse gain changer for a non-linear control system, which will compensate for the gain change in the non-linear element of the system to thereby maintain the transient response of system substantially invariant.

In carrying out this invention in one form, an inverse gain changer is provided which is actuated by the input signal to a non-linear system to provide a gain to the system which is the inverse of the gain provided by the non-linear element of the system.

Figure 2:
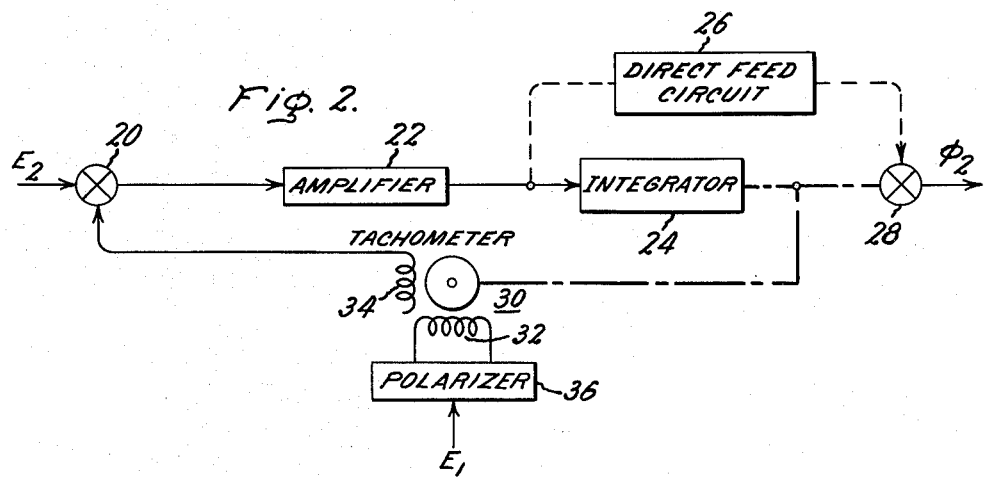

This invention will be better understood and the manner in which its objectives and advantages are obtained from the following description taken in connection with the accompanying drawing wherein:

FIGURE 1 is a block diagram of a non-linear control system provided with an inverse gain changer according to this invention, and FIGURE 2 is an electrical schematic diagram partially in block form showing one form of the inverse gain changer of this invention.

Referring now to the drawing wherein like numerals are used to indicate like parts throughout, and in particular with reference to FIG. 1, there is shown a non-linear control system provided with an inverse gain changer according to this invention. As shown in FIG. 1 the control system comprises a series arrangement of a linear element 10, an inverse gain changer 12, a multiplier or non-linear element 14, an actuator device 16 and a controlled device 17; the system being fed by an input or command signal $E_1$ and providing a desired output $\phi$. A feedback loop is provided through a sensor 18, of any desired type, and an integrator. The gain of this loop is proportional to the input or command signal $E_1$ due to the non-linearity of element 14. With the addition of the inverse gain changer 12, whose gain is inversely proportional to the input $E_1$, the gain of this loop is maintained constant.

To provide this desired inverse gain changing, the device shown in FIG. 2 may be used. The entire device is referred to as an inverse gain changer. A signal $E_2$ is fed to the summing point or adder 20. From summing point 20 the signal is fed to an amplifier 22 and this amplified signal is fed to an integrator 24. Alternatively, or in conjunction therewith, the signal from amplifier 22 may also be fed to a direct feed circuit 26. For example, the integrator 24 could be a motor while the direct feed circuit 26 could be a position servo, the output of motor 24 and direct feed circuit 26 being fed to a differential or summing point 28. In order to stabilize the loop formed by amplifier 22 and integrator 24, a feedback device is provided in the form of tachometer 30. The tachometer 30 may be for example, an A.-C. induction tachometer having a reference winding 32 and an output winding 34. The reference winding 32 is excited by the input or command signal to the system $E_1$.

The transfer function of motor 24 is:

$$\frac{K_T}{S(1+\tau_M S)}$$

and the transfer function of tachometer 30 is:

$$K_s S$$

From these transfer functions the ratio of output to input is:

$$\frac{\phi_2}{E_2} = \frac{1}{\left(\frac{1}{AK_T}+K_s\right)+\frac{\tau_M S}{AK_T}} \left[\frac{1}{S}+\frac{K_3}{K_T}(1+\tau_M S)\right] \quad (1)$$

where:

$E_2$ = Input to inverse gain changer
$\phi_2$ = Output from inverse gain changer
$A$ = Amplifier gain
$K_s$ = Tachometer gradient
$K_T$ = Motor gain
$\tau_M$ = Motor time constant
$K_3$ = Gain of direct feed circuit By making the gain of the amplifier very high and the time constant of the motor very small, Equation 1 is reduced to $$\frac{\phi_2}{E_2} = \frac{1}{K_T K_s}\left[\frac{K_T}{S}+K_3\right] \quad (2)$$

From Equation 2 it is evident that the gain of the loop shown in FIG. 2 varies inversely with the tachometer gradient.

As is well known to those skilled in this art, under steady state conditions, the tachometer gradient is proportional to field excitation, provided the field excitation is kept below saturation. In FIG. 2 the field excitation of the tachometer 30 is controlled by the command signal $E_1$ to the system, such as shown in FIG. 1. By operating tachometer 30 below saturation, the command signal produces a proportional tachometer gradient which, as shown by Equation 2 inversely changes the gain of the integrator.

When the excitation of the tachometer varies, a transient appears in addition to the steady state output. However, this transient is negligible if a drag-cup A.-C. generator or a D.-C. generator of small time constant is used. For example, consider a typical 400 c.p.s. generator of the drag-cup type with a phase shift of 10 degrees. The time constant of this generator would be 70 microseconds. Any transient caused by a variation in excitation of the tachometer field would die out within a fraction of a cycle of the carrier frequency, which cycle would be 1/400 second or 2500 microseconds. Therefore, under all conditions, the gradient of the tachometer is proportional to its excitation and the gain of the integrator shown in FIG. 2 varies inversely with this gradient, and therefore, to the command signal $E_1$.

When the signal $E_2$ to the inverse gain changer, shown in FIG. 2, reverses in polarity, the rotation of the tachometer reverses. In order to keep the tachometer output in phase with the signal $E_2$, it is necessary to maintain the polarity of the excitation of tachometer 30 unidirectional. To provide this unidirectional excitation the polarizer 36 is used. As shown in FIG. 2 the command $E_1$ is fed to the polarizer 36, and the output of polarizer 36 is used to excite the reference winding 32. Therefore, the excitation of the reference winding 32 is always of the same polarity, regardless of the change in polarity of the command signal and the inverse gain changer functions with either direction of the input signal.

It will be understood that tachometer 30 could be a D.-C. tachometer in which event the reference winding 32 would be the field winding of the D.-C. tachometer. By exciting the field winding 32 of the D.-C. tachometer by the command signal, the tachometer gradient would be proportional to the command signal and would thereby inversely change the gain of the integrator shown in FIG. 2.

Of course, it is obvious that other modifications can be made of the circuit shown and described. Therefore, while in accordance with the patent statutes there has been shown and described the preferred embodiment of the invention, it will be obvious to those skilled in the art that various changes or substitutions may be made without departing from the spirit and scope of the invention defined in the appended claims.

What is claimed as new and which is desired to be secured by Letters Patent of the United States is:

1. An inverse gain changer comprising; an integrator, means for feeding an input signal to said integrator, feedback means generating a feedback signal proportional to the output of said integrator, a command signal, means for exciting said feedback means by said command signal, said means including a polarizer for maintaining unidirectional excitation of said feedback means, and means for combining said input signal and said feedback signal, whereby the gain of said integrator varies inversely with said command signal.

2. In a control system having a non-linear element an inverse gain changer comprising; an amplifier and integrator in series forming a part of the control system, a tachometer for providing stabilizing feedback for said integrator and amplifier and means for exciting said tachometer by the command signal to the control system, said means including a polarizer for maintaining unidirectional excitation of said tachometer, whereby the gain of said amplifier and integrator varies inversely with said command signal.

3. In a control system including a non-linear element, and a command signal for said control system, said non-linear element having a gain proportional to said command signal, an inverse gain changer comprising an amplifier and integrator in series forming a part of the control system, a tachometer for providing stabilizing feedback for said integrator and amplifier, and means for exciting said tachometer by said command signal, the relationship between said means and tachometer being such that the feedback signal supplied to said control system will vary the gain of said amplifier and integrator in a manner inversely proportional to said command signal.

4. An inverse gain changer for providing a gain varying inversely with a control system command signal, said control system including a non-linear element having a gain proportional to said command signal, said inverse gain changer comprising an integrator, means for feeding an input signal to said integrator, feedback means for generating a signal proportional to the output of said integrator, means for exciting said feedback means by said command signal to thereby vary the gradient of said feedback means according to said command signal, and means for combining said input signal and said feedback signal in such manner that the gain of said integrator varies inversely with said command signal.

5. In a control system including a non-linear element, and a command signal for said control system, said non-linear element having a gain proportional to said command signal, an inverse gain changer comprising an integrator forming a part of said control system, an input signal to said integrator, feedback means for generating a signal proportional to the output of said integrator, means for varying the gradient of said feedback means proportional to said command signal, and means for combining said input signal and said generated signal, in such manner that the gain of said integrator varies inversely with said command signal.

References Cited in the file of this patent

UNITED STATES PATENTS

| 2,489,689 | Wald | Nov. 29, 1949 |
| 2,629,859 | Taylor | Feb. 24, 1953 |
| 2,802,160 | Engeler | Aug. 6, 1957 |
| 2,812,485 | Sheiber | Nov. 5, 1957 |

OTHER REFERENCES

Ahrendt, W. R.: Servomechanism Practice, McGraw-Hill, New York, 1954, p. 115, Fig. 8-1.